US006353979B1

(12) United States Patent
Traktovenko

(10) Patent No.: US 6,353,979 B1
(45) Date of Patent: Mar. 12, 2002

(54) TERMINATION FOR FLAT FLEXIBLE TENSION MEMBER

(75) Inventor: Boris Traktovenko, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/487,447

(22) Filed: Jan. 19, 2000

(51) Int. Cl.[7] ................................................ F16G 11/04

(52) U.S. Cl. ..................................................... 24/136 R

(58) Field of Search .......................... 24/115 M, 135 A, 24/135 R, 136 K, 136 L, 136 R; 187/264, 20, 22, 23, 26, 254, 266, 349, 350, 351, 373, 404, 411, 412, 414; 254/335, 400; 403/16, 210, 211, 213, 314, 374.1; 188/188

(56) References Cited

U.S. PATENT DOCUMENTS 2,085,333 A * 6/1937 Reynolds ..................... 24/136
4,313,243 A * 2/1982 Childress et al. ......... 24/136 K
4,561,154 A * 12/1985 Briscoe et al. ............ 24/136 R
RE32,847 E * 1/1989 Briscoe et al. ............ 24/136 R
5,199,137 A * 4/1993 Edwards .................... 24/136 K
5,553,360 A * 9/1996 Lucas et al. .............. 24/136 K
5,988,929 A * 11/1999 Doan .................. 24/136 R X

OTHER PUBLICATIONS

Patent Abstracts of Japan, vol. 014, No. 026 (M–921), Jan. 18, 1990 (JP 01 266341 A).

* cited by examiner

*Primary Examiner*—Anthony Knight
*Assistant Examiner*—Ruth C. Rodriguez

(57) ABSTRACT

Several embodiments of terminations for flat flexible tension members include wedge type terminations, pinching terminations, and frictional terminations and combinations of the above.

14 Claims, 4 Drawing Sheets

TERMINATION FOR FLAT FLEXIBLE TENSION MEMBER

TECHNICAL FIELD

The present invention relates to elevator systems. More particularly, the invention relates to various embodiments for terminating a flexible flat tension member.

BACKGROUND OF THE INVENTION

A conventional traction elevator system includes a car, a counterweight, two or more tension members interconnecting the car and counterweights; terminations for each end of the tension members at the connection points with the car and counterweights, a traction sheave to move the tension members and a machine to rotate the traction sheave. A second type of conventional elevator roping system is known to the art as a 2-to-1roping system where the rope is terminated to a dead hitch and not the counterweight and car. The tension members have traditionally been formed of laid or twisted steel wire which are easily and reliably terminated by means such as a compression terminations and potted terminations.

Compression-type terminations for steel tension members of larger diameters (conventional steel elevator tension members) are extremely effective and reliable. The range of pressures placed on such terminations is reasonably broad without adverse consequence. Providing that the pressure applied is somewhere reasonably above the threshold pressure for retaining the tension members, the termination is effective.

Clamp-type and existing wedge-type and termination devices have been employed for flexible flat tension members and are adept at providing reliable terminations. They do however generally require a large amount of overhead clearance space. Since space is always at a premium, it is desirable to provide a termination device which requires less overhead clearance.

SUMMARY OF THE INVENTION

The above-identified drawbacks of the prior art are overcome or alleviated by the termination device of the invention.

A tension member is terminated horizontally to reduce required clearance for the termination device. As one of skill in the art is aware elevator regulations continually reduce clearance areas such as overhead room to conserve building space. The art will be benefited by this invention which in one embodiment, provides a horizontally disposed socket into which a wedge is placed to terminate a tension member. Other embodiments include horizontally oriented lever type arrangements that minimize overhead space.

BRIEF DESCRIPTION OF THE DRAWINGS

Referring now to the drawings wherein like elements are numbered alike in the several FIGURES.

DETAILED DESCRIPTION OF THE INVENTION

Figure 1A:
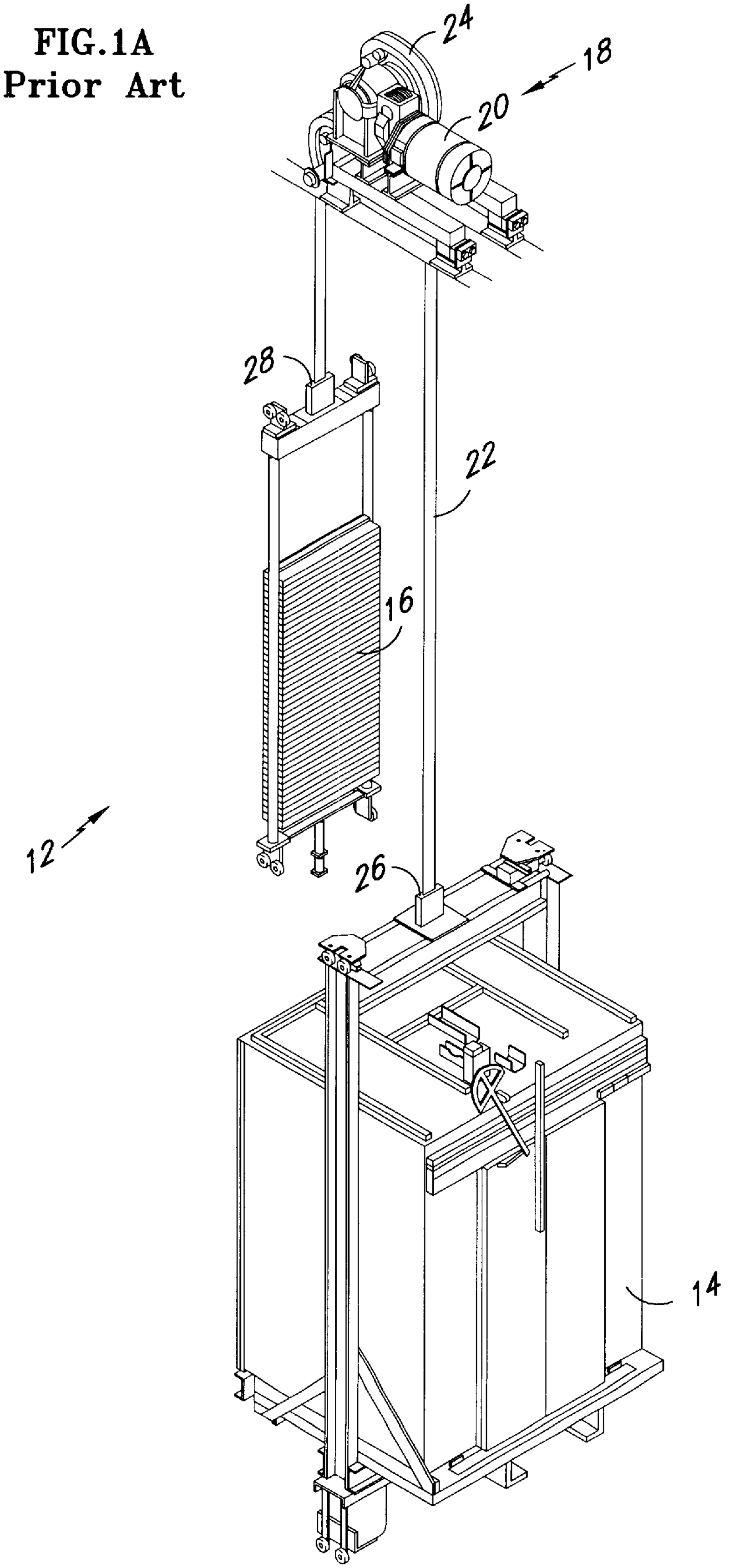
FIG. 1A Prior Art
FIG. 1A is a perspective view of a one-to-one elevator system.
Figure 1B:
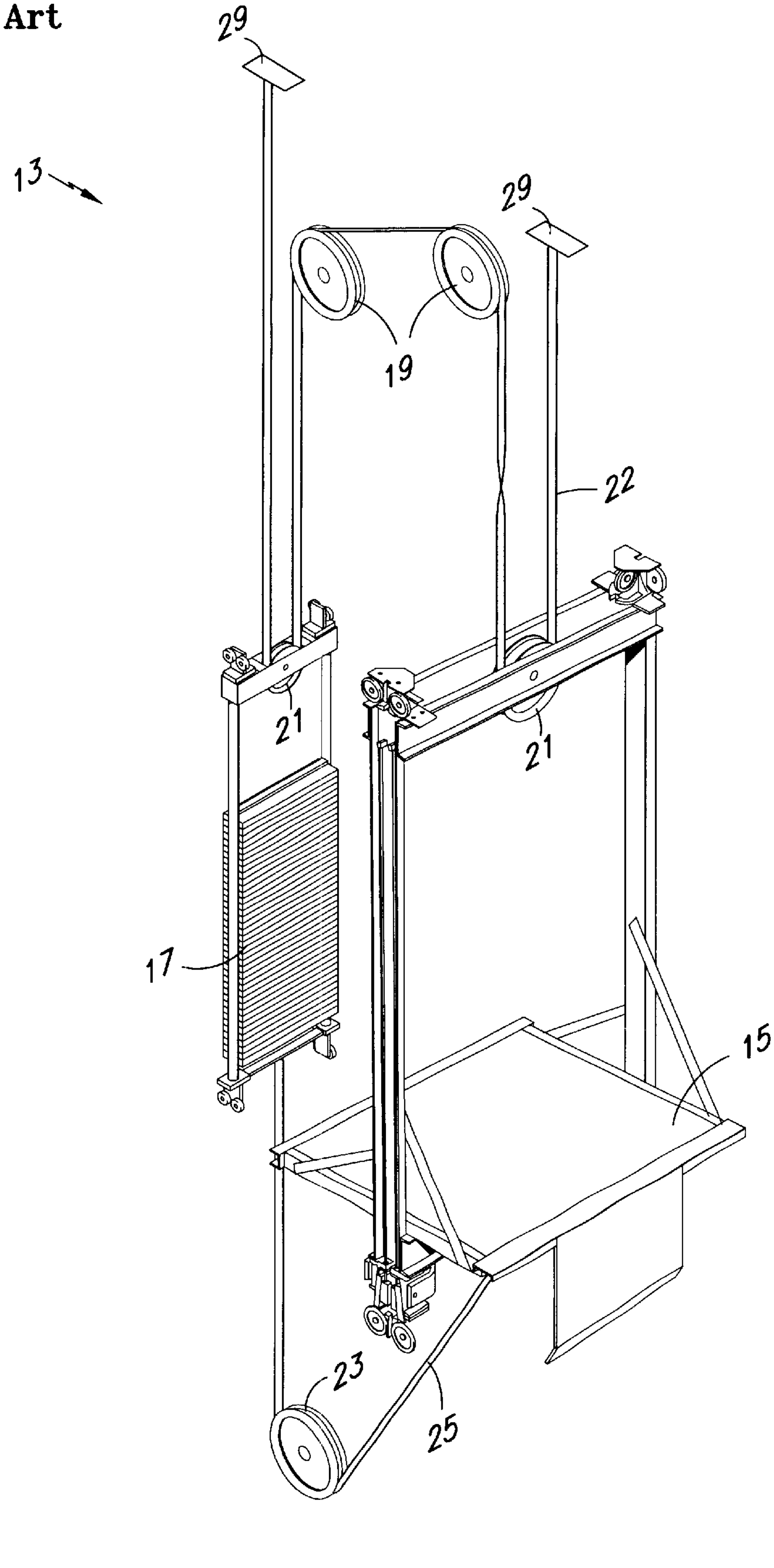
FIG.1B Prior Art
FIG. 1B is a perspective view of a two-to-one elevator system.

Referring to FIG. 1A, the relative location of the tension member termination device of the invention can be ascertained. For clarity, an elevator system 12 is illustrated having car 14, a counterweight 16, a traction drive 18 and a machine 20. The traction drive 18 includes a tension member 22 interconnecting car 14 and counterweight 16 which member is driven by sheave 24. In an alternate configuration, referring to FIG. 1B a two-to-one roping system is illustrated. The general components of such system are a car 15 and counterweight 17 which are interconnected by tension member 22 through idlers 21 and traction sheaves 19. Such systems are generally compensated by compensation line 25 and sheave 23. The tension member of this configuration is connected to dead end hitches at 29. Both ends of tension member 22, i.e., a car end 26 and a counterweight end 28 or, in a 2-to-1 roping embodiment, the two dead end hitches 29 must be terminated. It is either of these termination points for a flexible flat tension member with which the invention is concerned. An exemplary tension member of the type contemplated in this application is discussed in further detail in U.S. Ser. No. 09/031,108 filed Feb. 26, 1998 entitled Tension Member For An Elevator and U.S. Ser. No. 09/218,990 also entitled Tension Member For An Elevator and filed Dec. 22, 1998, both of which are entirely incorporated herein by reference. The elevator system depicted, is provided for exemplary purposes to illustrate the location of the device of the invention.

Figure 2:
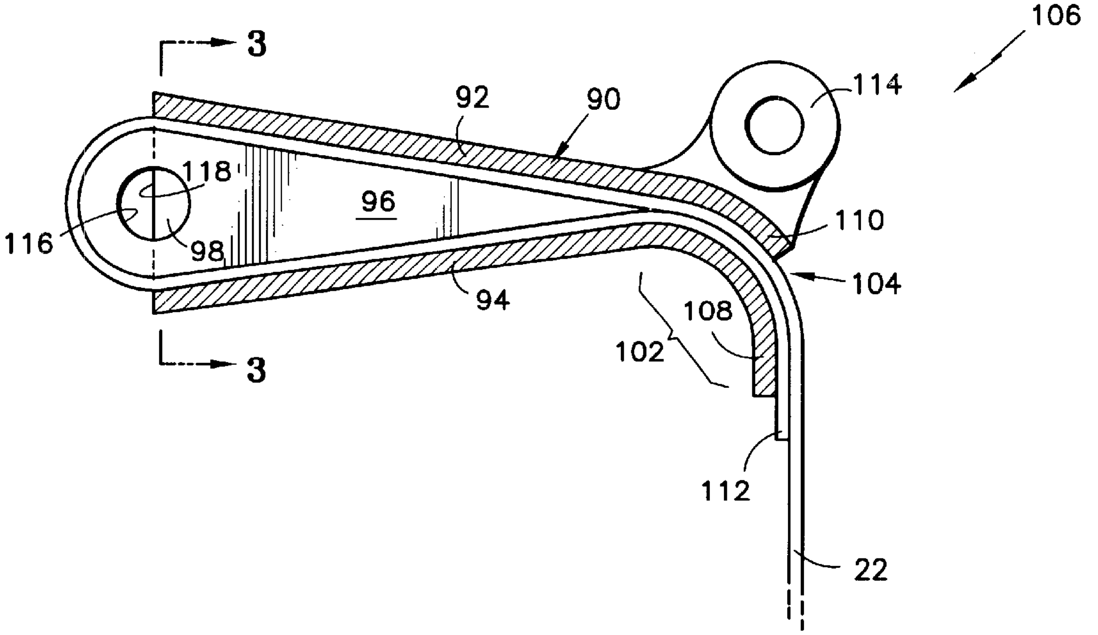
FIG. 2 is a chematic cross section view of an embodiment of the invention.
Figure 3:
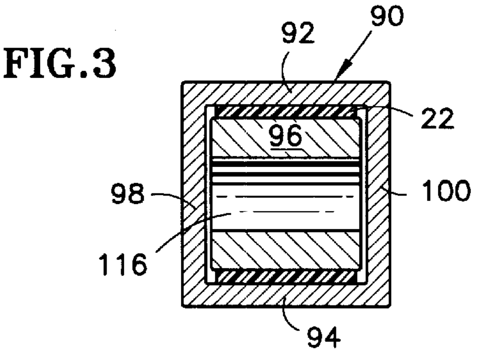
FIG. 3 is a cross section view of the embodiment of FIG. 2 taken along section line 3—3 in FIG. 2.

Referring to FIGS. 2 and 3, a horizontally oriented termination device is illustrated. It will be appreciated that the device is not limited to horizontal but may be disposed at any angle desired through adjustment of certain portions thereof as discussed hereunder. In the horizontally disposed configuration (shown), a socket 90 is preferably of a complex shape having first and second walls 92, 94 which follow a contour of a wedge 96 to be placed therein and side walls 98, 100 which are substantially parallel to one another and spaced appropriately to allow insertion of wedge 96 therebetween. At a hitch area 102 the first wall 92, second wall 94 and both side walls 98 and 100 preferably bend downwardly to an opening 104 in termination device 106. Tension member 22 extends into the device, on the right side and the top section (in the drawing), that is the load side of the device 106. It is preferred that the tension member 22 be configured in this way because this enables the elevator car load to provide an extra measure of holding strength by compressively loading its own end. It will be appreciated that the loaded side of this device is subject to the force exerted by a hanging elevator car or counterweight. It will be appreciated that the lower portion 108 of FIG. 2 which is a part of section 102, is longer than its upper counterpart 110. Portion 108 is longer because it allows the load on tension member 22 to place a compressive force on cut end 112 of tension member 22 against portion 108. This provides significant friction and will prevent tension member 22 from pulling through device 106 even if for some unlikely reason the wedge 96 becomes unintentionally unseated from socket 90. It should also be noted that even if tension member 22 is threaded into device 106 in the opposite direction, the friction provided by portion 108 yields more holding force than prior art terminations.

Termination device 106 is maintained in the desired position when under load by positioning pin hole bracket 114 in a specific position. Pin hole bracket 114 should be positioned to be centered over the direction of the load on tension member 22. By orienting the device relative to this centering, the attitude of the device will remain stable. It is preferable for the angle of the device relative to the direction of the load to be about 90 degrees to a vertical reference to minimize the height of the termination.

With respect to disassembly of device 106, wedge 96 is provided with through hole 116. As can be appreciated in FIG. 2, hole 116 is disposed within wedge 96 in a position to allow hole 116 to be about one-half exposed from socket 90 when the wedge 96 is in the fully engaged (loaded) position. Hole 116 provides a means of extracting wedge 96 from socket 90 by accepting a separate tapered rod (not shown) which can be tapped into hole 116. The rod will bear on a back surface 118 of socket 90 and urge wedge 96 out of socket 90.

Figure 4:
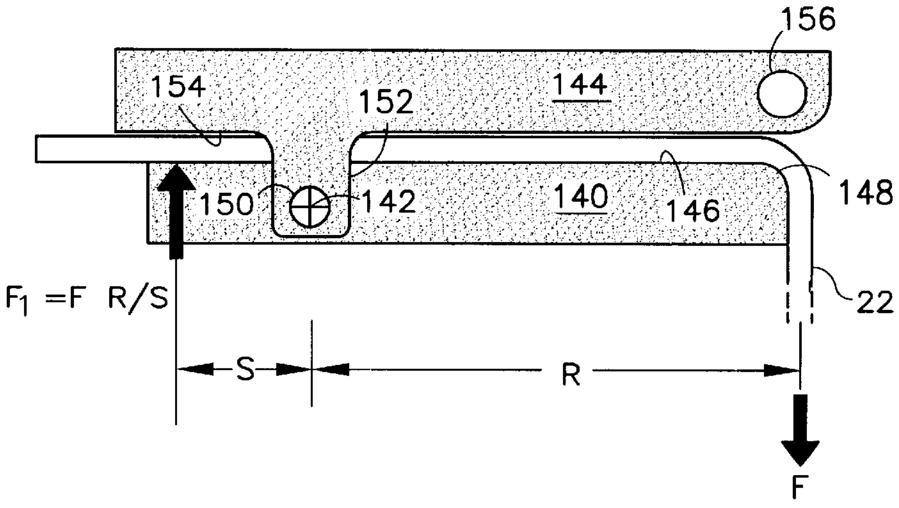
FIG. 4 is a schematic side elevation view of a second embodiment of the invention which employs leverage to apply a compressive force on a tension member.

Referring now to FIG. 4 another termination device of the invention is illustrated. This embodiment applies compressive force to the tension member 22 through a leverage arrangement. Leverage is created, by lower lever 140 through fulcrum 142 to upper level 144. It is to be understood the terms "lower" end and "upper" are relative and could be reversed without changing the friction of the device.

Lower lever 140 preferably provides a top friction surface 146 having a radiused load end 148 which radius is preferably selected to meet minimum bend radius requirements for a flat tension member. A pin 150 is provided for fulcrum 142. Preferably sufficient room is provided between a pair of arms 152 extending from lever 144 to receive lever 140 and tension member 22. Arms 152 are also preferably long enough to provide minimally enough space between surface 146 of lever 140 and a lower surface 154 of lever 144 to allow tension member 22 to be invested therebetween. It should also be noted that lever 144 is preferably longer than lever 140 in order to provide material in which pin hole 156 may be bored and be centered above a load direction of tension member 22.

Figure 5:
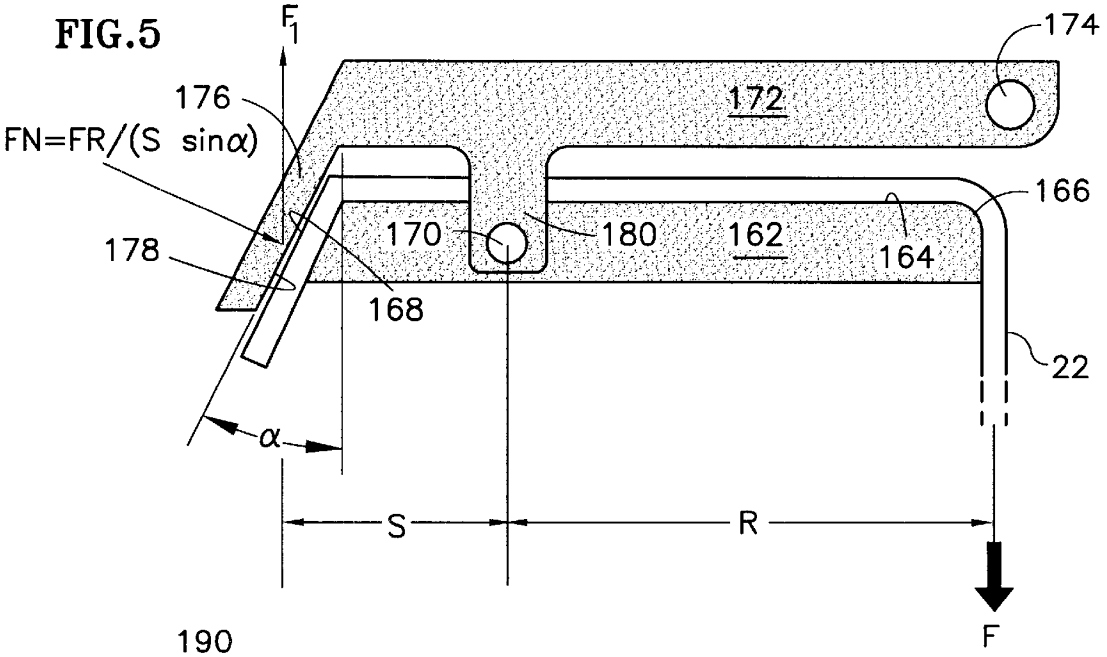
FIG. 5 is a schematic side view of a fifth embodiment similar to the embodiment of FIG. 4 but providing further and enhanced compressive area.

In another embodiment of the invention, referring to FIG. 5, the basic concept remains the same but compressive force generated by the device is enhanced due to the location of the generation of such force. The embodiment includes a lower level 162 having a friction surface 164 with a radius 166 on one edge thereof and an angled surface 168 on another edge thereof. A pivot pin 170 is located in a preselected position relative to the length of lower level 162. The appropriate placement of pin 170 is determined by calculation and is discussed further hereunder. An upper lever 172 is preferably longer than lever 162 on one end thereof to provide material through which pin hole 174 is provided. On an opposite end of lever 172 from pin hole 174 is angled section 176 which is provided with an angled contact surface 178. Contact surface 178 is preferably about parallel with angled surface 168 when the upper and lower levers 162, 172 are in a parallel relationship to one another. Arms 180 (only one visible) are preferably long enough to space lever 172 from lever 162 by an amount sufficient to ensure that compression of the rope occurs between surface 168 and 178 and not between the horizontal surfaces.

In the embodiment, the tension member 22 is threaded through from right to left in the drawing. The load (elevator car not shown) placed on tension member 22 causes the termination device to act by pulling the right side of lever 162 downwardly making the left side of lever 162 impinge on surface 178 of lever 172. The clamping or compressive force on the tension member between surfaces 168 and 178 is dictated by:

$$FN = F\frac{R}{(S\cdot\sin\alpha)}$$

Where

F is the load on tension member 22;

R is the distance between a center of load F and pivot point 170;

S is the distance between pivot point 170 and the desired location of clamping force FN, as shown in FIG. 12;

α is the angle between a line normal to lever 172 and surface 178.

Mechanical advantage is increased in this embodiment as can be illustrated by an example. Where the latter embodiment would create a mechanical advantage of 3, the angular surfaces of this embodiment where the angle α=20 degrees provide a mechanical advantage of 8.8. A significant enhancement is therefore realized in this embodiment without adding significant complexity to the device.

Figure 6:
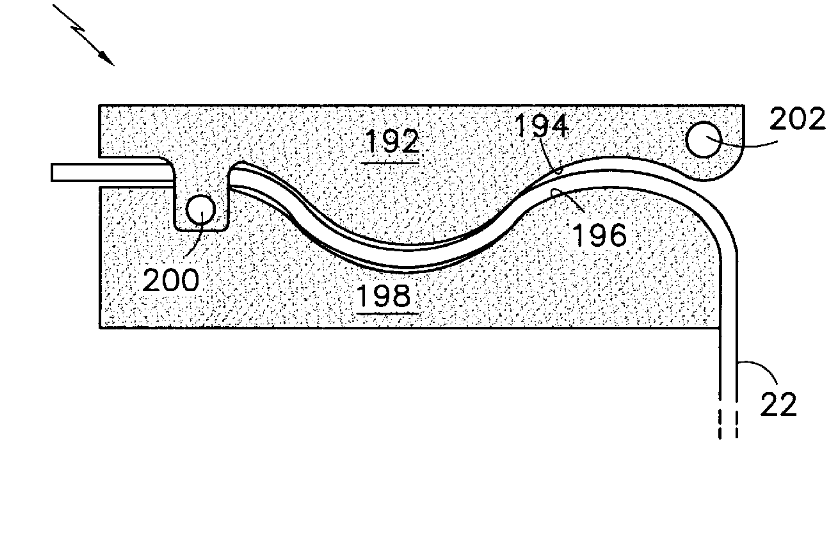
FIG. 6 is another schematic side view of a forth embodiment of the invention where friction in the device prior to the leverage point is enhanced.

In yet another similar embodiment of the invention, referring to FIG. 6, the termination device 190 is made shorter than its two proceeding cousins by adding frictional forces through curved contact surfaces. The device does not experience higher loading on the pivot than the embodiments of FIGS. 4 and 5. In this embodiment an upper lever 192 provides a sinuous contact surface 194 on its lower surface which approximates a sinuous contact surface 196 on lower lever 198. The sinuous surfaces provide enhanced frictional characteristics and thus remove additional tensile stress from tension member 22. By so removing the leverage on a pivot pin 200 in lower lever 198 is not made higher by a shorter overall length of device 190. A pin hole 202 is provided in upper lever 192 to secure device 190 to a dead end hitch (not shown).

Although the invention has been shown and described with respect to exemplary embodiments thereof, it should be understood by those skilled in the art that various changes, omissions, and additions may be made thereto, without departing from the spirit and scope of the invention.

What is claimed is:

1. A termination device for a tension member suspending an elevator car, said device comprising:

a socket having a load side friction surface, the load side friction surface being oriented generally orthogonally relative to an opening of the socket through which suspending the elevator car can extend; and a wedge receivable in said socket with the tension member threaded between the wedge and the socket, said wedge providing compressive and frictional force to the tension member threaded therethrough.

2. The termination device for an elevator car tension member as claimed in claim 1 wherein said socket routes the tension member around said wedge and back into contact with said tension member to provide a compressive force on a portion of said tension member.

3. The termination device for an elevator car tension member as claimed in claim 1 wherein the load side friction surface is oriented at an angle of about 90 degrees from a vertical reference direction of loading the tension member.

4. The termination device for an elevator car tension member as claimed in claim 1 wherein said wedge further includes a through hole to pry said wedge out of said socket during disassembly of said termination device.

5. The termination device according to claim 1, wherein the socket further comprises a region shaped to redirect the tension member from a vertical orientation into engagement with the load side friction surface.

6. The termination device for an elevator car tension member as claimed in claim 1 wherein said socket includes a dead hitch connector positioned in a centered relationship to a load to be placed in the tension member.

7. The termination device according to claim 6, wherein the dead hitch connector is aligned with a length of the tension member suspending the elevator car, and the load side friction surface projects at an angle relative to the length of the tension member.

8. A termination device, for a tension member which extends in a longitudinal direction and by which an elevator car is engaged for movement in the longitudinal direction, the termination device comprising:

a body having surfaces that define a space for receiving the tension member, wherein the space is elongated in a direction generally orthogonal to the longitudinal direction in which the elevator car is moved, such that retention forces are applied in the generally orthogonal direction to the tension member.

9. The termination device according to claim 8, further including a wedge adapted to be received within the space with the tension member wrapped around the wedge, so that tension in the tension member urges the wedge into the body.

10. The termination device according to claim 8, wherein the body further comprises a region shaped to redirect the tension member from the longitudinal direction into the space.

11. A reduced vertical clearance termination device for a tension member, wherein an elevator car is suspended for motion in a generally vertical direction by a length of the tension member, the termination device comprising:

a socket having two surfaces tapered relative to one another, each of the two surfaces being angled relative to the length of the tension member by which the elevator car is suspended, reducing a vertical dimension of the socket; and a wedge configured to fit between the two surfaces of the socket with the tension member wrapped around the wedge, so that tension in the length of the tension member draws the wedge into the socket with the tension member trapped between the wedge and at least one of the two surfaces of the socket.

12. The termination device according to claim 11, wherein the socket further comprises a dead hitch connector that is located over an axis of the length of the tension member.

13. The termination device according to claim 11, wherein the socket further comprises a region shaped to redirect the tension member from a generally vertical orientation into engagement with a first of the two surfaces of the socket.

14. The termination device according to claim 13, wherein, when the tension member is wrapped around the wedge and the tension in the tension member draws the wedge into the socket, the one of the two surfaces of the socket is the first of the two surfaces of the socket.

* * * * *

UNITED STATES PATENT AND TRADEMARK OFFICE

CERTIFICATE OF CORRECTION

PATENT NO. : 6,353,979 B1 
DATED : March 12, 2002
INVENTOR(S) : Boris Traktovenko It is certified that error appears in the above-identified patent and that said Letters Patent is hereby corrected as shown below:

Title page,
Item [12], should read -- Traktovenko, et al. --
Item [75], Inventor, should read:
-- Boris Traktovenko, Avon; Mark Orelup, Torrington; both of CT (US) --

Signed and Sealed this

Tenth Day of September, 2002

*Attest:*

JAMES E. ROGAN

*Attesting Officer* *Director of the United States Patent and Trademark Office*